United States Patent
Liffman et al.

(10) Patent No.: US 11,613,268 B2
(45) Date of Patent: Mar. 28, 2023

(54) OPERATIONALLY CUSTOMIZABLE SMART VEHICLE ACCESS

(71) Applicant: INTERNATIONAL BUSINESS MACHINES CORPORATION, Armonk, NY (US)

(72) Inventors: Dain Yap Liffman, Glen Waverley (AU); John Wagner, Carlton (AU); Hoang Tam Vo, Vermont (AU); Josh Andres, Melbourne (AU); Nick Waywood, Heidelberg Heights (AU)

(73) Assignee: International Business Machines Corporation, Armonk, NY (US)

( * ) Notice: Subject to any disclaimer, the term of this patent is extended or adjusted under 35 U.S.C. 154(b) by 160 days.

(21) Appl. No.: 16/285,886

(22) Filed: Feb. 26, 2019

(65) Prior Publication Data
US 2020/0269861 A1    Aug. 27, 2020

(51) Int. Cl.
*B60W 50/08* (2020.01)
*G05D 1/02* (2020.01)
(Continued)

(52) U.S. Cl.
CPC ........... *B60W 50/085* (2013.01); *B60R 25/24* (2013.01); *G05D 1/0223* (2013.01);
(Continued)

(58) Field of Classification Search
CPC ....... B60W 50/085; B60W 2050/0077; B60W 2556/50; B60W 2520/105; B60W 2520/10; B60W 2554/802; B60W 2554/801; B60W 60/00; B60W 60/0051; B60W 2720/106; B60W 2720/10; B60W 50/14; B60W 2050/0082; B60W 2050/0075;
(Continued)

(56) References Cited

U.S. PATENT DOCUMENTS 7,072,841 B1    7/2006  Pednault
7,272,841 B2    9/2007  Seomoon
(Continued)

OTHER PUBLICATIONS

Anonymous, "Method and system to alert a user per city/driving rules and user profile by applying cognitive learning system" IP.com; IPCOM000249508D. Mar. 2, 2017. 4 pages.
(Continued)

*Primary Examiner* — James J Lee
*Assistant Examiner* — Alexander George Matta
(74) *Attorney, Agent, or Firm* — Cantor Colburn LLP; Joseph Petrokaitis

(57) ABSTRACT

Computer-implemented methods, systems and computer program products for facilitating operationally customized access to smart vehicles are provided. Aspects include receiving request to access a smart vehicle. Aspects also include receiving vehicle operation constraints associated with the smart vehicle using a processor. Aspects also include generating a vehicle policy based at least in part on the request to access the smart vehicle and the vehicle operation constraints using the processor. The vehicle policy includes rules for operation of the smart vehicle. Aspects also include transmitting the vehicle policy to the smart vehicle. Aspects also include moderating the operation of the smart vehicle based on at least in part the vehicle policy.

15 Claims, 6 Drawing Sheets

(51) Int. Cl.
*G06Q 40/08* (2012.01)
*G06Q 30/06* (2023.01)
*B60W 50/00* (2006.01)
*B60R 25/24* (2013.01)
*G06Q 30/0645* (2023.01)

(52) U.S. Cl.
CPC ....... *G05D 1/0276* (2013.01); *G06Q 30/0645* (2013.01); *G06Q 40/08* (2013.01); *B60R 2325/205* (2013.01); *B60W 2050/0075* (2013.01); *B60W 2556/45* (2020.02); *G05D 2201/0213* (2013.01)

(58) Field of Classification Search
CPC ............... B60W 2556/45; B60R 25/24; B60R 2325/205; G05D 1/0223; G05D 1/0276; G05D 2201/0213; G05D 1/0214; G06Q 30/0645; G06Q 40/08
See application file for complete search history.

(56) References Cited

U.S. PATENT DOCUMENTS

| | | | |
|---|---|---|---|
| 7,812,712 B2 | 10/2010 | White | |
| 7,979,174 B2 | 7/2011 | Fregene | |
| 8,874,301 B1* | 10/2014 | Rao | B60K 28/04 701/25 |
| 9,288,270 B1* | 3/2016 | Penilla | H04L 67/141 |
| 9,443,436 B2 | 9/2016 | Scheidt | |
| 10,252,727 B1* | 4/2019 | Braun | B60W 50/12 |
| 2006/0271275 A1 | 11/2006 | Verma | |
| 2008/0245598 A1 | 10/2008 | Gratz | |
| 2011/0257846 A1* | 10/2011 | Bennett | B62D 1/046 701/45 |
| 2013/0204495 A1 | 8/2013 | Reed | |
| 2016/0185358 A1* | 6/2016 | Todasco | A61B 5/6893 701/48 |
| 2016/0257309 A1* | 9/2016 | Kumar | B60W 50/0097 |
| 2017/0263120 A1* | 9/2017 | Durie, Jr. | G08G 1/205 |
| 2018/0111628 A1* | 4/2018 | Tamagaki | B60W 30/16 |
| 2018/0191714 A1* | 7/2018 | Jentzsch | G06F 21/445 |
| 2018/0345972 A1* | 12/2018 | Turkoglu | B60W 30/143 |
| 2020/0130577 A1* | 4/2020 | Mitra | G08G 1/0129 |

OTHER PUBLICATIONS

Carcloud. "Carcloud ECommerce for serious car rental companies." https://www.carcloud.com/ecommerce/ (retrieved Jul. 11, 2022), 4 pages.

Maximize Market Research. "Semi-Autonomous and Autonomous Vehicles Market: Industry Analysis and Forecast (2020-2026)—By Level of Automation, Technology, Component, and Fuel Type, Region." https://www.maximizemarketresearch.com/market-report/semi-autonomous-autonomous-vehicles-market/1387/ (retrieved Jul. 11, 2022), 7 pages.

Research and Markets. "$126.8 Billion Autonomous Vehicle Market: Global Drivers, Restraints, Opportunities, Trends, and Forecasts 2017-2023." https://www.prnewswire.com/news-releases/1268-billion-autonomous-vehicle-market-global-drivers-restraints-opportunities-trends-and-forecasts-2017-2023-300486159.html (retrieved Jul. 11, 2022), 5 pages.

Sheivachman. "Hertz and Avis Prep for Future With Self-Driving Car Partnerships." Skift. https://skift.com/2017/08/14/car-rental-giants-plan-for-future-with-automated-car-partnerships/ (retrieved Jul. 11, 2022). Aug. 2017. 4 pages.

The Economist. "The driverless, car-sharing road ahead." Abstract, https://www.economist.com/business/2016/01/09/the-driverless-car-sharing-road-ahead (retrieved Jul. 11, 2022), 1 page.

Williams. "Car rental companies are nervous about driverless cars, so they're doing something about it." Mashable.com, https://mashable.com/article/self-driving-cars-and-rental-companies#1eOQz7Q.UOqG (retrieved Jul. 11, 2022). Jun. 2017. 5 pages.

* cited by examiner

OPERATIONALLY CUSTOMIZABLE SMART VEHICLE ACCESS

BACKGROUND

The present invention generally relates to programmable computing systems, and more specifically, to computing systems, computer-implemented methods, and computer program products configured to facilitate operationally customized access to smart vehicles.

Vehicle technology is moving towards the continued development and improvement of smart vehicles, such as semi-autonomous or fully autonomous vehicles. A fully autonomous vehicle is a vehicle that can be referred to as "self-driving" whereas a semi-autonomous vehicle is a vehicle that can automate certain aspects of driving (e.g., automatic braking in response to detection of a potential collision). Wireless technology, such as a mobile application executed by a smart phone, is presently used to allow a user to order a ride-share vehicle or taxi, and it is anticipated that such systems will eventually extend to the reservation of smart vehicles.

SUMMARY

Embodiments of the present invention are directed to a computer-implemented method for facilitating operationally customized access to smart vehicles. A non-limiting example of the computer-implemented method includes receiving a request to access a smart vehicle. The method also includes receiving vehicle operation constraints associated with the smart vehicle using a processor. The method also includes generating a vehicle policy based at least in part on the request to access the smart vehicle and the vehicle operation constraints using the processor. The vehicle policy includes rules for operation of the smart vehicle. The method also includes transmitting the vehicle policy to the smart vehicle. The method also includes moderating the operation of the smart vehicle based at least in part on the vehicle policy.

Embodiments of the present invention are directed to a system for facilitating operationally customized access to smart vehicles. The system includes a memory having computer readable computer instructions, and a processor for executing the computer readable instructions. The computer readable instructions include instructions for receiving request to access a smart vehicle using the processor. The computer readable instructions also include instructions for receiving vehicle operation constraints associated with the smart vehicle using the processor. The computer readable instructions also include instructions for generating a vehicle policy based at least in part on the request to access the smart vehicle and the vehicle operation constraints. The vehicle policy includes rules for operation of the smart vehicle. The computer readable instructions also include instructions for transmitting the vehicle policy to the smart vehicle. The computer readable instructions also include instructions for moderating the operation of the smart vehicle based at least in part on the vehicle policy.

Embodiments of the invention are directed to a computer program product for facilitating operationally customized access to smart vehicles, the computer program product comprising a computer readable storage medium having program instructions embodied therewith. The program instructions are executable by a processor to cause the processor to perform a method. A non-limiting example of the method includes receiving request to access a smart vehicle using the processor. The method also includes receiving vehicle operation constraints associated with the smart vehicle using the processor. The method also includes generating a vehicle policy based at least in part on the request to access the smart vehicle and the vehicle operation constraints. The vehicle policy includes rules for operation of the smart vehicle. The method also includes transmitting the vehicle policy to the smart vehicle. The method also includes moderating the operation of the smart vehicle based at least in part on the vehicle policy.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
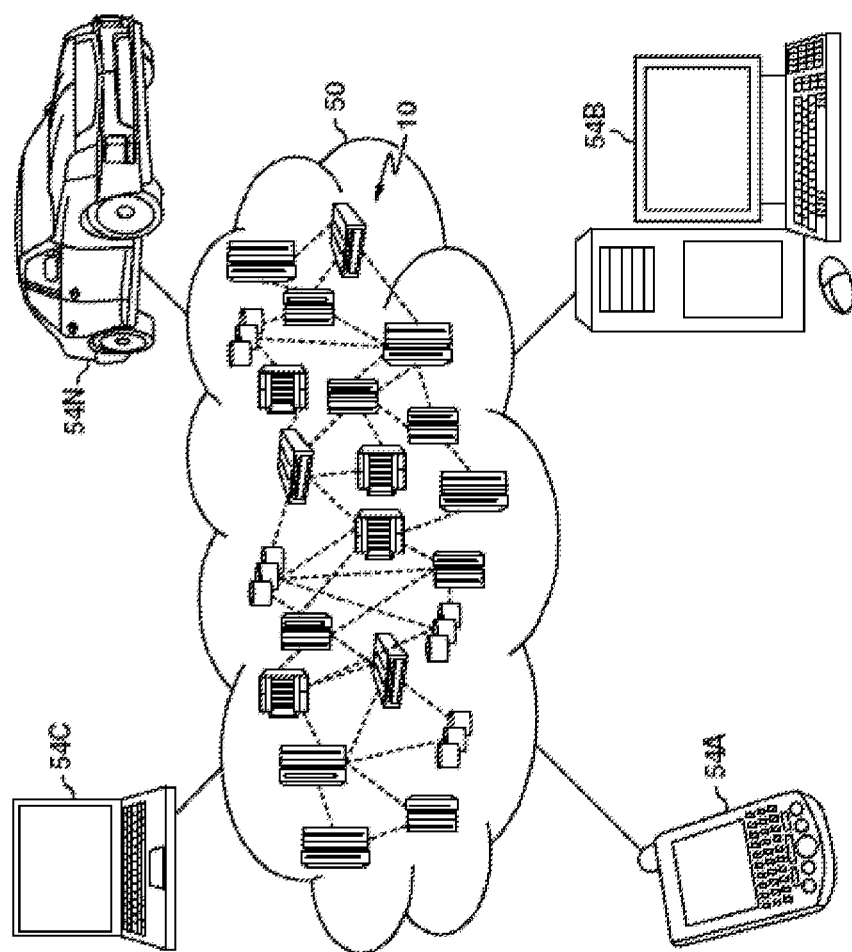
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
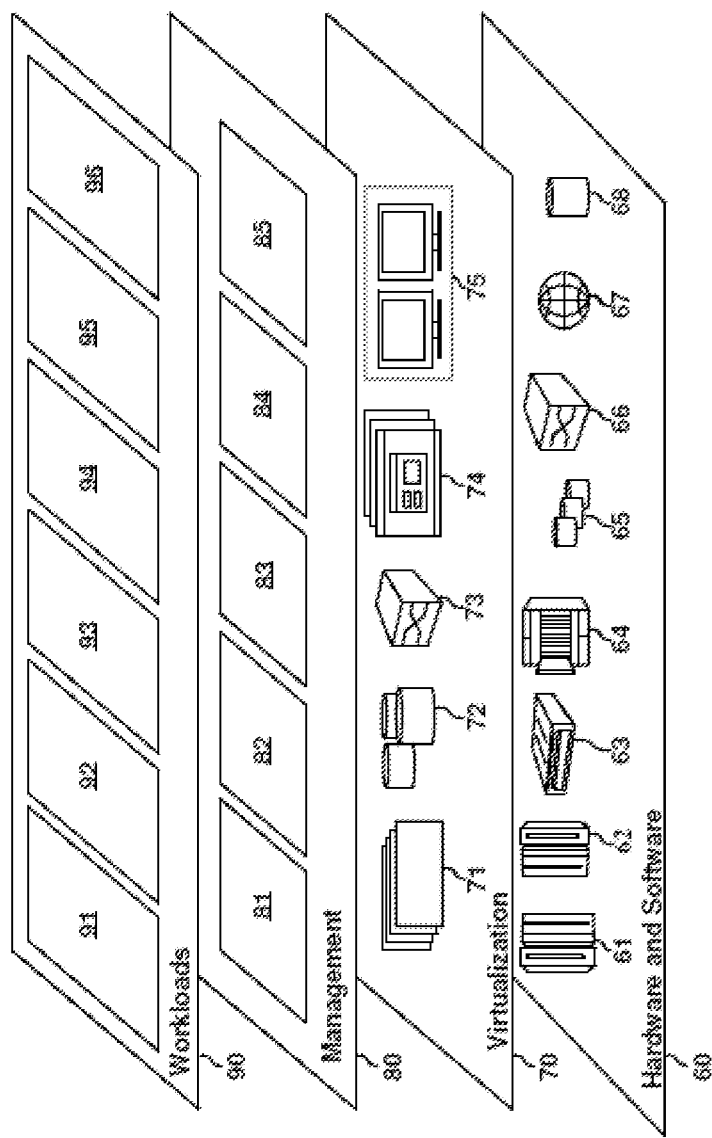
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and facilitating operationally customized access to smart vehicles 96.

Figure 3:
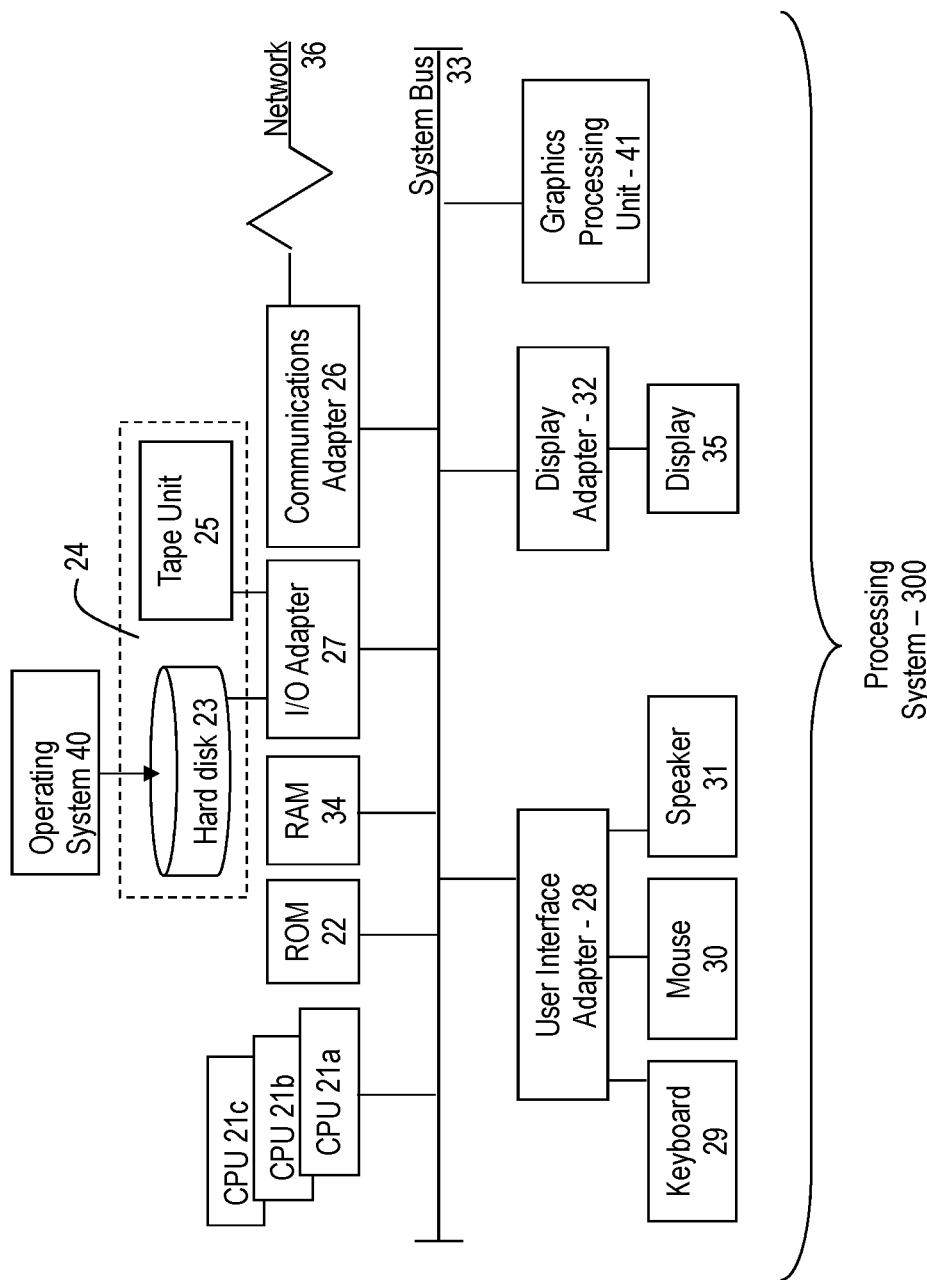
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 3.

In exemplary embodiments of the invention, a system for facilitating operationally customized access to smart vehicles is provided. In exemplary embodiments of the invention, the system can allow an owner of a smart vehicle to specify constraints on the operation of the smart vehicle accessed by a third party, such as during a rental of the smart vehicle. For example, the owner may specify constraints that restrict the top speed, acceleration, deceleration, mileage, proximity to other vehicles and objects, permissible geographic locations, permissible weather, or permissible times of day or days of the week that the authorized user is permitted to operate the smart vehicle. The constraints are embodied in a vehicle policy that can be downloaded to the smart vehicle for ensuring adherence to the vehicle policy. For example, a fully autonomous vehicle may automatically drive in a manner that complies with the specified constraints. In some embodiments of the invention, a semi-autonomous vehicle may allow a user to drive and the system may monitor the driver's compliance with the vehicle policy and provide warnings to the driver or automated corrective actions to the operation of the vehicle to comply with the vehicle policy. In some embodiments of the invention, the system may also enable an insurer of the vehicle to place constraints on the operation of a smart vehicle accessed by an authorized user. Alternative optional constraints provided by the owner and/or insurer of the smart vehicle can be associated with different rental prices. For example, the constraints may provide a range of optional top speed constraints (e.g., 55 mph, 65 mph, 75 mph, etc.) that may be placed on the smart vehicle that are each associated with different pricing and the authorized user may select the desired package of pricing and constraints. So, for example, if a driver wants to be able to drive the smart vehicle in a riskier fashion (e.g., higher top speeds, closer to other vehicles/objects, driving in dangerous weather, etc.) or a fashion that is more likely to produce wear and tear on the smart vehicle, then both the owner and the insurer may require the authorized user to pay a higher price to account for the added risk. In some embodiments of the invention, the authorized user may specify desired operational features in the access request and the system may match the authorized user to the smart vehicle offered for access (e.g., offered for rent) based on the constraints associated with the smart vehicle. The system can facilitate an access agreement between the parties, which according to some embodiments of the invention, may be embodied and administered as a smart contract via a decentralized distributed database. According to some embodiments of the invention, the system may monitor the authorized user's operation of the smart vehicle and may "upgrade" the operational constraints (e.g., increase the top speed from 50 mph to 60 mph) based on determining that the authorized user's operation of the smart vehicle has exceeded some threshold, such as for example, driving in a manner that adheres to the operational constraints for a threshold period of time. In some embodiments of the invention, the system may monitor the authorized user's operation of the vehicle and provide the authorized user with the option to "upgrade" a rental package to include less restrictive constraints or can automatically upgrade the rental package upon determining that the vehicle policy has been violated. In this way, the disclosed technology can allow an owner, an insurer and an authorized user of a smart vehicle to reach an agreement for the access to the smart vehicle and the system can ensure that the operation of the smart vehicle comports with the constraints set by the owner and/or insurer, or alternatively charge the authorized user more for failing to comport with the constraints. The technology provides for a technical capability for an owner of a smart vehicle to automatically monitor and ensure that their vehicle is not operated in an objectionable or damaging fashion. The technology can similarly be used by an organization having a fleet of smart vehicles to manage the operation and ensure quality control of the fleet.

Figure 4:
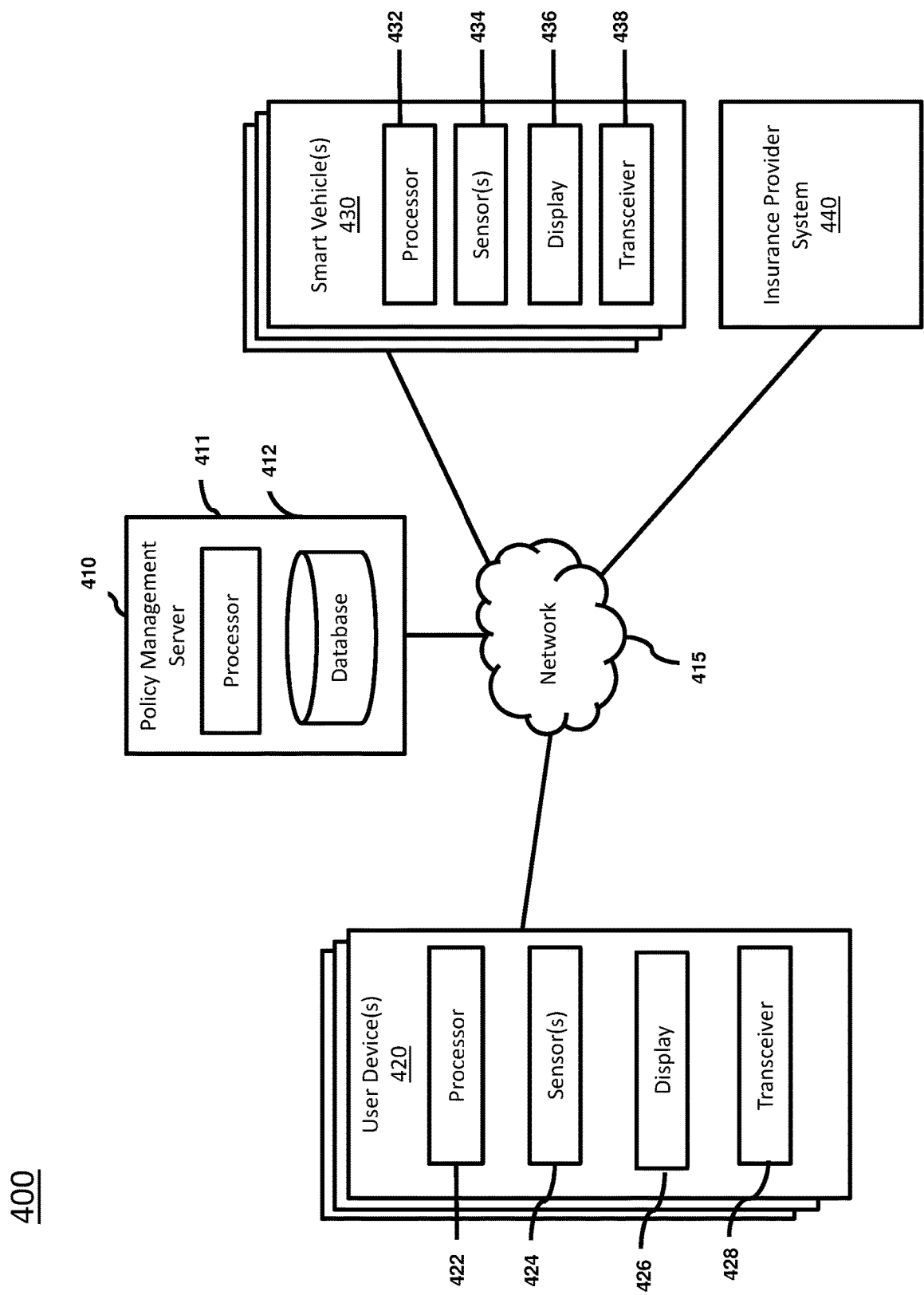
FIG. 4 depicts a system upon which facilitating operationally customized access to smart vehicles may be implemented according to one or more embodiments of the present invention.

Turning now to FIG. 4, a system 400 for facilitating operationally customized access to smart vehicles will now be described in accordance with an embodiment. The system 400 includes a policy management server 410 in communication with user devices 420, smart vehicles 430, and optionally an insurance provider system 440, via communications network 415. The communications network 415 may be one or more of, or a combination of, public (e.g., Internet), private (e.g., local area network, wide area network, virtual private network), and may include wireless and wireline transmission systems (e.g., satellite, cellular network, terrestrial networks, etc.).

According to exemplary embodiments of the invention, policy management server 410 may be configured to generate a vehicle policy based on operational constraints specified by an owner and/or an insurer of a smart vehicle 430. A policy management server includes one or more processors 411 for executing the functionalities described herein and a storage medium 412 for storing data used to achieve the functionalities. In some embodiments of the invention, policy management server 410 can be embodied as, for example, a processing system 300 or implemented as part of a cloud computing environment 50. According to some embodiments of the invention, an owner may use a user device 420 to input operational constraints, pricing, and other such information with respect to a smart vehicle 430 to be offered for rent or otherwise offered for access to an authorized user. Likewise, an insurer or a smart vehicle 430 may be associated with an insurance provider system 440 that may communicate with policy management server 410 to provide operational constraints, pricing and other data provided by the insurer. The policy management server 410 can receive the operational constraints provided by the owner and/or insurer and can generate a vehicle policy based on the received operational constraints. A vehicle policy can be instructions or code to be executed by a smart vehicle 430 to moderate the operation of the smart vehicle 430 in accordance with the specified operational constraints and other aspects of a vehicle rental or vehicle use by an authorized user. For example, if an operational constraint indicates that the smart vehicle 430 is not to exceed a top speed of 70 mph, the vehicle policy may include a set of instructions for monitoring the speed of the smart vehicle 430 and cutting off acceleration of the smart vehicle 430 when it reaches 70 mph. In some embodiments of the invention, the vehicle policy may include instructions to generate a warning such a dashboard message or an audio message to warn the driver when the driver is approaching the boundary of a constraint. For example, when the smart vehicle reaches 65 mph, the vehicle policy may cause the smart vehicle 430 to display a messaging warning the driver that they are close to exceeding the 70 mph constraint. In some embodiments of the invention, the vehicle policy may include instructions to automatically adjust the operation of the smart vehicle 430 to place it within the boundaries of a specified constraint after detecting that the constraint has been violated. In some embodiments of the invention, the vehicle policy may include instructions to prevent the smart vehicle 430 from exceeding one or more specified operational constraints. In some embodiments of the invention, a vehicle policy may include instructions to present the driver with a selectable option to change or violate an operational constraint in exchange for paying a higher rental rate, or the vehicle policy may be configured to simply allow the driver to violate a particular operational constraint and automatically charge the driver an agreed upon higher rate.

In some embodiments of the invention, the vehicle policy may include instructions for providing sensor data to policy management server 410 and policy management server 410. Sensor data can include speed, direction, acceleration, deceleration, proximity to other objects, vehicle component failure warnings, tire pressures, gas or battery power levels, data relating to the steering of the vehicle (e.g., data indicative of steady vs. erratic driving), location data (e.g., GPS coordinates), and any other such data that may be derived from a sensor disposed on or about a smart vehicle 430. According to some embodiments of the invention, the policy management server 410 may provide instructions to a smart vehicle 430 based on the vehicle policy. For example, the policy management server 410 may provide instructions to the smart vehicle 430 to activate a governor to cap the top speed of the vehicle or may instruct the smart vehicle to move away from an object. The policy management server 410 may track the location of the smart vehicle 430 to ensure adherence to any geographical limitations placed on the authorized access, use or rental of the vehicle. For example, the owner of a smart vehicle 430 may specify that the smart vehicle 430 is not to be taken out of a specified area (e.g., it must stay within the city limits) or may not drive down certain roads (e.g., roads associated with high accident rates). In some embodiments of the invention, the policy management server 410 may receive delayed and/or near real-time third party data relating to weather, traffic, hazards, or other such occurrences that may have an impact on the operation or condition of the smart vehicle 430. Such third party data may be obtained for example, via the Internet or through connections to third party servers. In some embodiments of the invention, policy management server 410 may analyze the third party data to determine whether it impacts a smart vehicle's 430 adherence to specified operational constraints. For example, if an owner specifies that they don't want their smart vehicle 430 to be driven in muddy conditions, the policy management server 410 may determine that a smart vehicle 430 is approaching muddy conditions based on its location (e.g., a countryside road) and the weather (e.g., rainy). Operational constraints may be functions of time, location, weather or other conditions. For example, a top speed constraint may be a function of the location of the vehicle, for example, a top speed may be equal to "the speed limit" or "the speed limit minus 5 mph" or "the speed limit minus 5 mph when dark outside."

In some embodiments of the invention, in response to determining (e.g., based on sensor data of the smart vehicle 430 and/or third party data) that an aspect of smart vehicle operation is approaching a boundary associated with a rule or constraint for operation of the smart vehicle 430, the policy management server 410 may cause the smart vehicle 430 to perform an attenuation action to avoid violating the operational constraint. Attenuation actions may include but are not limited to for example, reducing speed of the smart vehicle, reducing acceleration of the smart vehicle, causing the smart vehicle to display a warning to a driver of the smart vehicle, switching the smart vehicle from a semi-autonomous mode to a fully autonomous mode or causing the smart vehicle to drive to a specified location. Thus, for example, if an operational constraint specifies that the smart vehicle 430 is not to be driven in weather that includes hail, in response to determining that hail is occurring or is likely to occur in an area encompassing or near to the location of the smart vehicle 430, the policy management server 410 may provide an instruction to the smart vehicle 430 to either notify the driver to head to a covered area or cause the smart vehicle 430 to automatically reroute to a covered area. In various embodiments of the invention, some automatic actions such as automatically rerouting the smart vehicle 430, may be overridden by the authorized user by for example, the authorized user agreeing to a higher rental fee. For example, the smart vehicle 430 may be configured to display an override option to the driver and the driver may agree by, for example, selecting a button on a touchscreen display of the smart vehicle 430 or providing an oral statement of agreement to a microphone of smart vehicle 430.

According to some embodiments of the invention, policy management server 410 can be configured to generate an access agreement between the owner and authorized user of the smart vehicle 430. Optionally, the access agreement may also include the insurer of the smart vehicle. The access agreement can be embodied as a digital document that can be digitally signed after authenticating each party through various known authentication methods (e.g., two-factor authentication). The access agreement can be stored by policy management server 410 and/or electronically transmitted to each party of the agreement. Policy management server 410 may also update or create addendums to the agreement based on modifications to the agreement that are agreed to by the authorized user. For example, if the authorized user originally agreed to a top speed constraint of 65 mph but is presented with and agrees to a new operational constraint of 75 mph for an extra $50 fee, the policy management system may update the agreement accordingly. According to some embodiments of the invention, the agreement may be stored by a central repository such as the policy management server 410. In other embodiments of the invention, the agreement and/or vehicle policy may be stored and executed as a smart contract in a decentralized distributed database, such as blockchain. As will be appreciated by those of skill in the art, use of a decentralized distributed database for storage and execution of the smart contract provides various benefits, such as, providing security benefits to the integrity of the data by having multiple copies of the data stored on a plurality of devices, ensuring integrity of the agreement by allowing the agreement and all modifications to be publically recorded and displayed, and allowing for contextual conditioned-based execution of the agreement and associated constraints/vehicle policies. Storing transaction data in this way may also although an insurer to audit usage data (and in particular usage by a third party authorized user) relating to an owner's vehicle so that the insurer may ensure adherence to insurance policies covering the vehicle, as storage of such records in a decentralized distributed database ensures that the records cannot be tampered with or erased.

As will be appreciated by those of skill in the art, a blockchain is computer-based decentralized distributed database comprised of individual blocks connected in a chain. Each block is comprised of a block header and transactional data. In general, a block header contains metadata describing the version of the block chain, a cryptographic hash of the previous block, a root hash describing each transaction contained in the block, a timestamp, a difficulty setting for mining the block, and a nonce value. The block hash value is derived from an encryption algorithm that converts a series of input numbers and letters into an encrypted output having a fixed length. Each successive block comprises a hash pointer as a link to a previous block, thereby creating the chain. Due to the difficulty of mining a block, the integrity of the data contained in each block is resistant to bad actors attempting to modify or delete data. For this reason, a blockchain is suitable system for recording transactions or executing smart contracts between suppliers and clients.

Embodiments of the present invention can employ blockchain code to record agreements between owners (and optionally insurers) and authorized users of smart vehicles. These smart contracts can be stored on a public database and are resistant to unauthorized change or modification as described above. The smart contracts are also self-executable upon the occurrence of terms and conditions agreed upon by the parties. The blockchain can record the terms of the agreement and/or vehicle policy as well a record of any financial transaction between the parties. The decentralized nature of these agreements as well as the public nature of the recordings can reduce the necessity of middle men and transactional costs. According to some embodiments of the invention, each smart vehicle 430 may include a wallet or a public/private key pair to allow it to access and download the stored agreement and/or vehicle policy from the blockchain. According to some embodiments of the invention, the blockchain may store a downloadable copy of the vehicle policy (e.g., originally uploaded to the blockchain by policy management server 410) that may be downloaded by the smart vehicle 430 as the result of calling a smart contract on the blockchain.

User devices 420 are configured to allow owners and authorized users of smart vehicles to specify operational constraints, desired operational features and pricing in order to reach an agreement regarding the access or rental of a smart vehicle 430, via for example, a mobile application executed on a smartphone. In exemplary embodiments of the invention, user devices 420 can include, but are not limited to, a smartphone, a wearable device such as a smartwatch, an augmented reality headset, a tablet, a smart speaker, a television, or any other suitable electronic device that may be implemented using some or all of the features of a computer system such as the one shown in FIG. 3. A user device 420 includes a processor 422, one or more sensors 424, a display 426 and a transceiver 428. The sensors 424 can include one or more of an image capture device (e.g., digital camera) for obtaining images and/or videos, a microphone for obtaining audio recordings, and a location sensor for obtaining location data of the user device (e.g., GPS coordinates). User devices 420 can include an input device, such as a keyboard (either physical or digital) for receiving user input text. Text can also be input orally via a microphone using voice recognition. In some embodiments of the invention, display 426 is configured to display images and/or video. In some embodiments of the invention, display 426 can be a touchscreen that may be configured to detect tactile user inputs (e.g., typing, pressing, swiping, etc.). Transceiver 428 can be configured to allow a user device 420 to communicate with other devices via communications network 415 (e.g., via Wi-Fi, cellular communications, etc.). User device(s) 420 can be configured to execute a mobile application that provides an interactive user interface that allows a user to input data related to the specification of operational constraints, pricing, desired operations, and other such data that may be used by the policy management server 410 to facilitate an operationally customized access to (or rental of) a smart vehicle 430.

A smart vehicle 430 can be an autonomous (i.e., self-driving vehicle) or a semi-autonomous vehicle. A semi-autonomous vehicle can be a vehicle that allows a driver manual control of operation of the vehicle, but that may occasionally automate some driving features of the vehicle (e.g., the vehicle may automatically stop before a detected collision occurs). In some embodiments of the invention, a semi-autonomous vehicle may be a vehicle that is capable of toggling between a driver-controlled mode and an autonomous driving mode. According to some embodiments of the invention, a semi-autonomous smart vehicle 430 may be configured to switch from a driver-controlled mode to an autonomous driving mode in response to a command from policy management server 410 or based on the occurrence of some detected condition, such as a detected violation of the vehicle policy received from the policy management server 410. According to some embodiments of the invention, a smart vehicle 430 includes a processor 432 paired with a memory or storage device for executing the functionality described herein and a transceiver 438 for wirelessly communicating with the policy management server 410. A smart vehicle also includes one or more sensor(s) 434 for detecting various operating conditions of the vehicle duration operation and a display 436, such as a touchscreen display, a heads up display or the like, for displaying messages generated by policy management server 410. The sensors 434 can include but are not limited to sensors configured to measure speed, acceleration, impacts, tire pressure, heat, vehicle temperature, smoke detection, engine (or other component) faults, proximity to or movement of nearby objects, visibility of the vehicle cameras (e.g., as it relates to the disabling of the semi-autonomous or fully autonomous driving modes and providing notification to the driver and updates to the vehicle policy), vehicle performance, how long the vehicle was driven/operated and other such quantities that may be relevant to the safety, performance and condition of the smart vehicle 430 during operation.

In some embodiments of the invention, smart vehicle can be configured to receive and execute a vehicle policy received from the policy management server 410 to moderate the operation of the smart vehicle 410. For example, in some embodiments of the invention, a smart vehicle 430 can monitor the operational characteristics of the vehicle relative to the operational constraints represented by the vehicle policy and take various actions based on the situation. With respect to some operational constraints, the smart vehicle 430 may "strict enforcement" of the constraints by taking over control of from the driver to for example, reduce the speed of the vehicle, move the vehicle away from an object, or automatically drive the vehicle to a specified location in response to determining that the constraint has been violated. Whereas with respect to other operational constraints, the smart vehicle 430 may provide for a "soft enforcement" of the constraints by providing warnings to the user that the user has violated the constraint and providing a time window for correction before strict enforcement, or by providing warnings that the user is coming close to violating the constraint, or by providing the user with an option to modify the access agreement to expand the agreed upon operational range of the smart vehicle 430 in view of a new rental price. According to some embodiments of the invention, a smart vehicle 430 may provide sensor data to the policy management server 410 and receive instructions from the policy management server 410 to perform an attenuation or enforcement action in response to the policy management server's 410 determination that the operation of the smart vehicle 430 violates or is close to violating a specified constraint.

According to some embodiments of the invention, insurance provider system 440 may be a server, a computing device such as processing system 300 or a distributed system such as cloud computing environment 50. Insurance provider system 440 may be configured to provide suggested operational constraints and/or related rental pricing recommendations with respect to one or more smart vehicles 430 to policy management server 410 on behalf of an insurer of the one or more smart vehicles 430. In a case where both the owner and the insurer provide operational constraints and/or rental pricing recommendations, the policy management server 410 may be configured to rectify the dual recommendations by for example, selecting the owner's constraints for use, selecting the insurer's constraints for use, or merging the two sets of constraints. According to some embodiments of the invention, if there is a conflict between the two sets of constraints (e.g., the owner specifies a top speed of 70 mph and the insurer specifies a top speed of 60 mph), the policy management server 410 can resolve the conflict by selecting either the owner's or the insurer's constraint as being the controlling constraint, or by for example, averaging or otherwise combining the values of the specified constraints.

Figure 5:
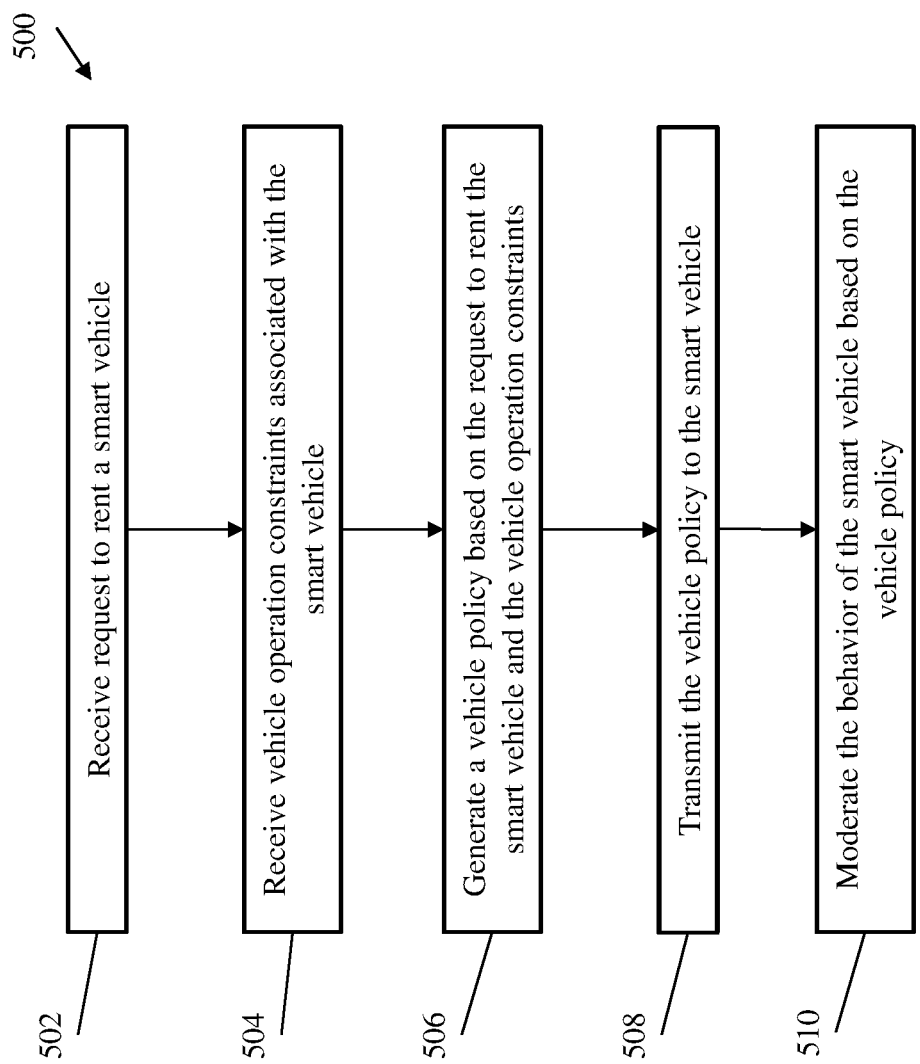
FIG. 5 depicts a flow diagram of a method for facilitating operationally customized access to smart vehicles according to one or more embodiments of the invention.

FIG. 5 depicts a flow diagram of a method for facilitating operationally customized access to smart vehicles according to one or more embodiments of the invention of the invention. In one or more embodiments of the present invention, the method 500 may be embodied in software that is executed by computer elements located within a network that may reside in the cloud, such as the cloud computing environment 50 described herein above and illustrated in FIGS. 1 and 2. In other embodiments of the invention, the computer elements may reside on a computer system or processing system, such as the processing system 300 described herein above and illustrated in FIG. 3, or in some other type of computing or processing environment.

The method 500 begins at block 502 and includes receiving (e.g., by policy management server 410) a request to access a smart vehicle using a processor. For example, an authorized user may use a user device 420 to input a request to access a smart vehicle to for example, rent the smart vehicle, which may or may not include desired operational characteristics and/or desired pricing. In some embodiments of the invention, the request to access the smart vehicle may include one or more desired operational features of the smart vehicle, such as for example, a desired top speed or authorization to drive in particular weather conditions or on particular roads. According to some embodiments of the invention, the user associated with the request may be authenticated by the system and the request may be presented to the insurance provider system 440 for processing. In some embodiments of the invention, the insurance provider system 440 may generate operational constraints based on the identity and/or driving record of the person making the request. Accordingly, based on the records stored or accessible by the insurance provider system 440, the insurer and/or owner can modify the operational constraints and/or price of a rental based on an assessment of the risk presented by the requestor. Thus, if someone has a spotless driving record, the owner/insurer may feel more comfortable allowing more relaxed operational conditions and charging less for the rental, however the opposite may be true for a requester who has a history of accidents and/or traffic violations.

At block 504, the method 500 includes receiving (e.g., by policy management server 410) vehicle operation constraints associated with the smart vehicle using the processor. As described previously above, the vehicle operation constraints can include limitations of the smart vehicle operation received from at least one of the owner of the smart vehicle and an insurer of the smart vehicle. In some embodiments of the invention, the vehicle operation constraints can include different rental costs based on different limitations or constraints. In other words, in some embodiments of the invention, some vehicle operation constraints may be represented as a set of alternatives which are each associated with alternative prices (e.g., top speed of 55 mph cost $20, a top speed of 65 mph cost $30 and a top speed of 75 mph cost $50). Constraints may be grouped into sets (e.g., an "economy operational package" vs. a "premium operational package") or may be individually listed and customizable.

At block 506, the method 500 includes generating (e.g., by policy management server 410) a vehicle policy based at least in part on the request to access the smart vehicle and the vehicle operation constraints. For example, if the smart vehicle 430 offered for access or rent by the owner matches the criteria for a rental vehicle sought by the authorized user, then the system (e.g., policy management server 410) may generate an access agreement and the vehicle policy based on the specified operational constraints associated with the smart vehicle 430 that is the subject of the access agreement. In some embodiments of the invention, the policy management server 410 may generate a vehicle policy based on the vehicle operation constraints alone prior to receiving a request. For example, an owner of a smart vehicle 430 may be inflexible with the operational constraints associated with the smart vehicle 430 and so the smart vehicle 430 may load the stored standard vehicle policy whenever it is accessed or rented. According to some embodiments of the invention, the vehicle operation constraints can include a plurality of sets of vehicle operation constraints and the smart vehicle policy can be generated based at least in part on a selected one of the plurality of sets of vehicle operation constraints. For example, an owner may specify different combinations of constraints that are associated with different pricing schemes and the authorized user may select one of the sets. According to some embodiments of the invention, a vehicle policy may include rules for operation of the smart vehicle. The rules for operation of the smart vehicle can include performing an automatic action (e.g., such as adjusting the speed, direction or other movement of the smart vehicle) or displaying a message to the driver based on a determination that a condition of the rules being met. In some embodiments of the invention, a vehicle policy may include instructions for actions to perform in response to determining that a given rule or operational constraint has been violated or is in danger of being violated.

At block 508, the method 500 includes transmitting (e.g., by the policy management server 410) the vehicle policy to the smart vehicle. According to some embodiments of the invention, the smart vehicle 430 may execute instructions provided by the vehicle policy to enforce one or more operational constraints, provide warnings that an operational constraint is in danger of being violated, or provide the authorized user with options to amend the access agreement to change the operational constraints, depending on the situation and the intent of the owner and/or insurer of the smart vehicle 430 as represented by the operational constraints. In alternative embodiments of the invention, the policy management server 410 may not transmit the vehicle policy to the smart vehicle 430 but may instead administer the vehicle policy by providing instructions to the smart vehicle 430 based on sensor data received by the policy management server 410. In some embodiments of the invention, actions taken by the smart vehicle 430 based on the vehicle policy may be initiated by either or both of the smart vehicle 430 and the policy management server 410.

At block 510, the method 500 includes moderating (e.g., by the policy management server 410) the operation of the smart vehicle 430 based at least in part on the vehicle policy. In some embodiments of the invention, moderating the operation of the smart vehicle 430 may include receiving sensor data from the smart vehicle 430, monitoring the operational conditions (e.g., speed, acceleration, proximity to objects, etc.) of the smart vehicle 430 for compliance with specified operational constraints, predicting or detecting violations of the operational constraints, and providing warnings, attenuation actions, or offers to modify the agreement and operational constraints to the authorized user. The policy management server 410 may receive third party data, such as weather data, traffic data, hazard data, and the like, for use in determining whether the operation of a smart vehicle 430 is violating or is predicted to violate a specified operational constraint.

According to some embodiments of the invention, the smart vehicle 430 can be an autonomous vehicle and moderating the operation of the smart vehicle 430 based at least in part on the vehicle policy can include providing (e.g., by the policy management server 410) the smart vehicle 430 with instructions to operate within operational boundaries defined by the rules for operation of the smart vehicle 430.

In some embodiments of the invention, the smart vehicle 430 may be a semi-autonomous vehicle and moderating the operation of the smart vehicle 430 based on the vehicle policy can include receiving sensor data from the smart vehicle 430, determining, based on the sensor data, that an aspect of smart vehicle 430 operation is approaching a boundary associated with a rule for operation of the smart vehicle 430 and causing the smart vehicle 430 to perform an attenuation action. Attenuation actions can include one or more of reducing speed of the smart vehicle, reducing acceleration of the smart vehicle, causing the smart vehicle to display a warning to a driver of the smart vehicle, switching the smart vehicle from a semi-autonomous mode to a fully autonomous mode, causing the vehicle to open a communication link with the owner, insurer or rental company, providing an audio warning (e.g., in advance of the vehicle heading into a hazardous area, a prohibited area or an area that may cause additional charges to be levied) or causing the smart vehicle to drive to a specified location.

According to some embodiments of the invention, moderating the operation of the smart vehicle 430 based on the vehicle policy can include providing the smart vehicle with instructions to perform an automatic action in response to a determination made by the smart vehicle 430 that operation of the smart vehicle 430 violates a specified threshold for operation of the smart vehicle. Specific thresholds may include for example, a maximum speed, a maximum acceleration, a maximum deceleration, a minimum distance to a neighboring object, a location that is out of a predefined boundary, an environmental condition or a price surge (e.g., the cost of the current action exceeds an authorized cost). A price surge threshold may represent that a cost of the current action/operation of the smart vehicle 430 exceeds an authorized maximum. For example, if the smart vehicle 430 enters a location where a hazard exists that is expected to pose a substantial risk to the vehicle (e.g., the vehicle turns down a road where a protest is occurring), a cost of the vehicle may exceed a threshold based on a modification to the policy such that an automatic action may be performed.

According to some embodiments of the invention, the method 500 may further include generating an access agreement between the owner of the smart vehicle and an authorized user associated with the request to access the smart vehicle, wherein the access agreement memorializes terms of an access and use (e.g., a rental) of the smart vehicle by the authorized user. In some embodiments of the invention, the access agreement can be stored and executed by the policy management server 410. In some embodiments of the invention, the access agreement can be stored and executed as a smart contract in a decentralized distributed database. For example, the policy management server 410 or smart contract may cause the payment, refund, or modification of the access agreement to occur in relation to the occurrence of one or more events (e.g., a completion of a rental without incident, an agreed upon modification of the agreement, etc.). According to some embodiments, a smart contract may receive sensed information (e.g., a planned GPS route, smoking detected in the cabin, etc.) and compares the sensed information against policy restrictions and triggers a response if the policy is broken. Due to the organizational structure of a decentralized distributed database, storing the access agreement in a decentralized distributed database may prevent deletion of the access agreement by a single user, which provides benefits of transaction security and preservation of accurate records. Storing the access agreement in a decentralized distributed database can also provide privacy benefits, as the identity of the owner of the smart vehicle 430 and the identity of a party requesting access to the smart vehicle 430 may not be publically displayed by the decentralized distributed database, thereby allowing one or both parties to remain anonymous.

Figure 6:
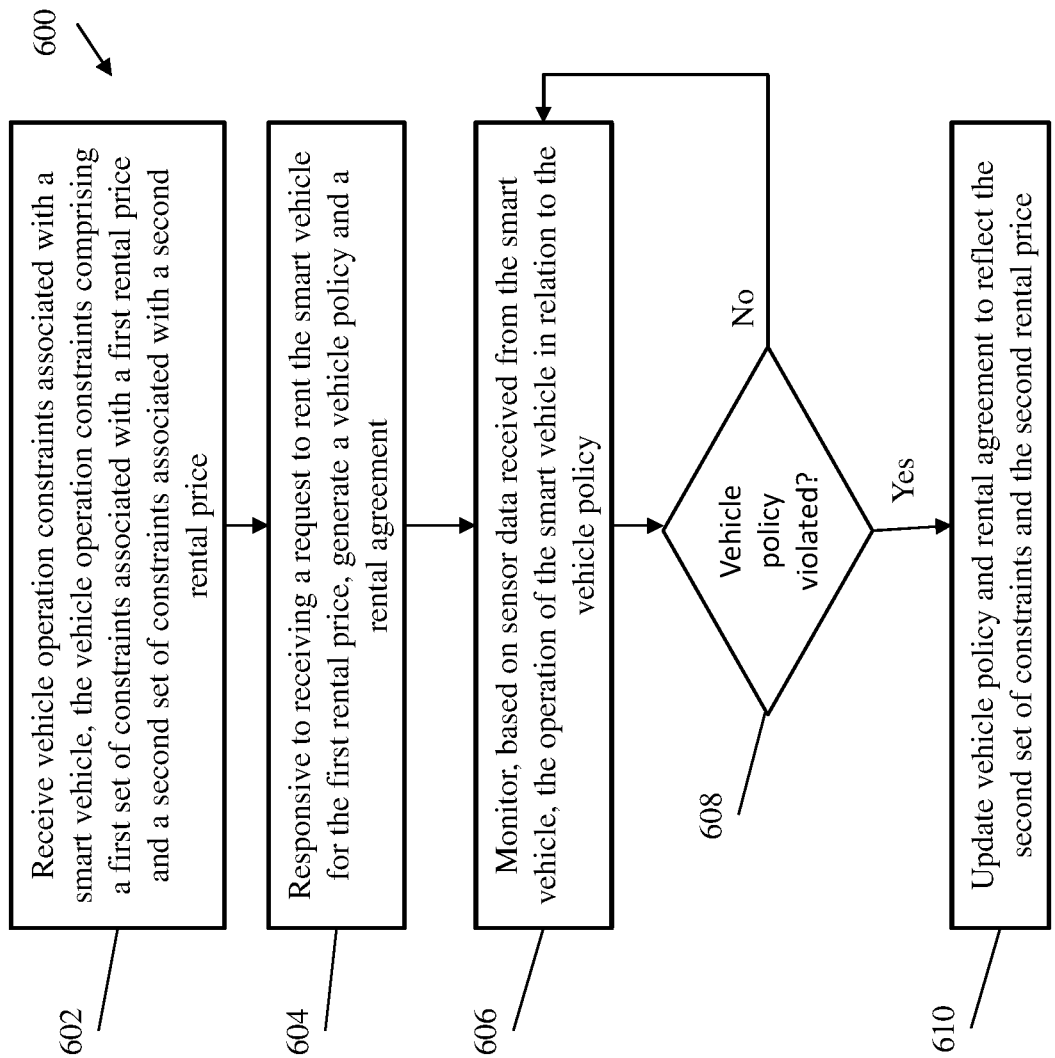
FIG. 6 depicts a flow diagram of a method for modifying an operationally customized access to a smart vehicle according to one or more embodiments of the invention.

Turning now to FIG. 6, a flow diagram of a method 600 for modifying an operationally customized access to a smart vehicle in accordance with an embodiment is shown. In one or more embodiments of the present invention, the method 600 may be embodied in software that is executed by computer elements located within a network that may reside in the cloud, such as the cloud computing environment 50 described herein above and illustrated in FIGS. 1 and 2. In other embodiments of the invention, the computer elements may reside on a computer system or processing system, such as the processing system 300 described herein above and illustrated in FIG. 3, or in some other type of computing or processing environment.

The method 600 begins at block 602 and includes receiving vehicle operation constraints associated with a smart vehicle. The vehicle operation constraints can include a first set of constraints associated with a first rental price and a second set of constraints associated with a second rental price. According to some embodiments of the invention, the vehicle operation constraints can include a plurality of sets of constraints that are associated with a respective plurality of rental prices. In some embodiments of the invention, individual constraints may be associated with variable pricing. For example, a highest top speed constraint may specify the highest top speed that the smart vehicle is allowed to drive and may include different prices for different speeds. For example, a base level rental may include a highest top speed constraint of 50 mph, but the owner may specify that for an extra $100 the highest top speed constraint may be raised to 60 mph, or for an extra $300 the highest top speed constraint may be raised to 70 mph, and so on. Thus, the system may allow an owner and/or the insurance company insuring the smart vehicle to provide variable pricing based on a constraint by constraint basis or in association with sets or tiers of constraints. According to some embodiments of the invention, the system may allow an authorized user to "upgrade" the allowed operational constraints of the smart vehicle by agreeing to pay a specified higher rate associated with a particular constraint (e.g., highest top speed) or associated with a set of constraints. As described below, in some embodiments of the invention, the system may automatically upgrade one or more operational constraints and charge the authorized user the associated upgraded price, automatically in response to determining the authorized user's operation of the smart vehicle has violated the vehicle policy representative of the originally agreed-upon constraints.

At block 604, responsive to receiving a request to access the smart vehicle for the first rental price, the method includes generating a vehicle policy and an access agreement in a manner similar to that previously described above. According to some embodiments of the invention, the system may present an authorized user with a plurality of different operational configurations and associated prices and the request to access the smart vehicle may represent the authorized user's selection of an operational configuration. In some embodiments of the invention, the request may represent desired operational features and acceptable price ranges and the system (e.g., policy management server 410) may match the authorized user with an available smart vehicle 430 that is associated with operational constraints and prices that meet the authorized user's needs.

At block 606, the method includes monitoring the operation of the smart vehicle 430 in relation to the vehicle policy based on sensor data received from the smart vehicle 430. As previously described above, either or both of the smart vehicle 430 and the policy management server 410 may receive sensor data from vehicle sensors 434 to monitor the operational condition of the smart vehicle 430.

At block 608, the method includes determining whether the vehicle policy has been violated. For example, the system may determine if a constraint (e.g., top speed =65 mph) embodied by the vehicle policy has been violated. Examples of policy violations may include but are not limited to, exceeding a specified top speed, exceeding a specified level of acceleration or deceleration, violating a minimum distance to be kept from nearby objects, driving out of a specified area, driving on a restricted road, driving during restricted weather conditions, smoking (or other such prohibited activities) in the vehicle, driving to restricted events (e.g., a protest), exceeding a maximum drive time or the like. If the system (e.g., policy management server 410) determines that the vehicle policy has not been violated, then the method 600 may return to block 606 to continue monitoring. If the system determines that the vehicle policy has been violated, then the method 600 may proceed to block 610.

At block 610, the method includes updating the vehicle policy and access agreement to reflect the second set of constraints and the second rental price. The update may be determined in accordance with conditions associated with the original agreement and/or vehicle policy. For example, the original agreement may specify that the agreed upon top speed is 65 mph, but if this speed is exceeded, then the new top speed is 75 mph and the authorized user will pay an extra $100. Thus, in this example, upon the system determining that the driver has exceeded 65 mph, the system (e.g., policy management server 410) will amend the agreement and the vehicle policy to indicate that the new agreed upon top speed is 75 mph and that the authorized user has now agreed to pay $100 more. The system may cause a notification to be displayed or played to the authorized user (e.g., by a display or speakers of a smart vehicle 430) to inform the authorized user of the new agreement. In some embodiments of the invention, the system may provide the authorized user with a warning and a grace period before the agreement is updated. For example, upon exceeding the top speed, the system may notify the authorized user that the authorized user has five seconds to return below the initially agreed upon top speed before the authorized user is deemed to have agreed to the "upgrade."

Additional processes may also be included. It should be understood that the processes depicted in FIGS. 5 and 6 represent illustrations, and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
receiving, using a processor, a request to access a smart vehicle;
receiving, using the processor, vehicle operation constraints associated with the smart vehicle;
generating, based at least in part on the request to access the smart vehicle and the vehicle operation constraints, a vehicle policy, the vehicle policy comprising rules for operation of the smart vehicle, wherein the vehicle policy is generated based at least in part on a first set of the vehicle operating constraints and a second set of the vehicle operating constraints;
wherein the first set of the vehicle operating constraints comprises vehicle operating parameter limits that define a level of vehicle damage risk that is acceptable to an owner of the smart vehicle;
wherein the second set of the vehicle operating constraints comprise vehicle operating parameter limits that define a level of vehicle wear and tear that is acceptable to the owner of the smart vehicle;
transmitting the vehicle policy to the smart vehicle; and
moderating the operation of the smart vehicle based at least in part on the vehicle policy;
wherein moderating the operation of the smart vehicle based on the vehicle policy comprises providing the smart vehicle with instructions to perform an automatic action in response to a determination made by the smart vehicle that operation of the smart vehicle is predicted to violate a specified threshold for operation of the smart vehicle for a grace period of time, wherein the grace period of time is provided to an authorized user of the smart vehicle in a notification prior to automatically upgrading, wherein the automatic action comprises automatically upgrading the selected one of the plurality of sets of vehicle operation constraints, wherein moderating the operation of the smart vehicle comprises switching the smart vehicle from a driver-controlled mode to an autonomous driving mode in response to at least one of a command from policy management server or an occurrence of a detected violation of the operation of the smart vehicle; and
wherein the specified threshold comprises one of a maximum speed, a maximum acceleration, a maximum deceleration, a minimum distance to a neighboring object, a location that is out of a predefined boundary, and an environmental condition.

2. The computer-implemented method of claim 1, wherein the smart vehicle comprises an autonomous vehicle and moderating the operation of the smart vehicle based at least in part on the vehicle policy comprises providing the smart vehicle with instructions to operate within operational boundaries defined by the rules for operation of the smart vehicle.

3. The computer-implemented method of claim 1, wherein the vehicle operation constraints comprise limitations of the smart vehicle operation received from at least one of an owner of the smart vehicle and an insurer of the smart vehicle.

4. The computer-implemented method of claim 1, wherein the request to access the smart vehicle comprises one or more desired operational features of the smart vehicle.

5. The computer-implemented method of claim 4 further comprising generating an access agreement between the owner of the smart vehicle and an authorized user associated with the request to access the smart vehicle, wherein the access agreement memorializes terms of a rental of the smart vehicle by the authorized user.

6. The computer-implemented method of claim 5, wherein the access agreement is stored and executed as a smart contract in a decentralized distributed database such that deletion of the access agreement from the decentralized distributed database by a single user is prevented.

7. The computer-implemented method of claim 1, wherein the smart vehicle comprises a semi-autonomous vehicle and moderating the operation of the smart vehicle based on the vehicle policy comprises:
  receiving sensor data from the smart vehicle;
  determining, based on the sensor data, that an aspect of smart vehicle operation is approaching a boundary associated with a rule for operation of the smart vehicle; and
  causing the smart vehicle to perform an attenuation action.

8. The computer-implemented method of claim 7, wherein an attenuation action is one of reducing speed of the smart vehicle, reducing acceleration of the smart vehicle, causing the smart vehicle to display a warning to a driver of the smart vehicle, switching the smart vehicle from a semi-autonomous mode to a fully autonomous mode, and causing the smart vehicle to drive to a specified location.

9. A system comprising:
  a processor communicatively coupled to a memory, the processor configured to:
    receive a request to access a smart vehicle;
    receive vehicle operation constraints associated with the smart vehicle;
    generate, based at least in part on the request to access the smart vehicle and the vehicle operation constraints, a vehicle policy, the vehicle policy comprising rules for operation of the smart vehicle, wherein the vehicle policy is generated based at least in part on a first set of the vehicle operating constraints and a second set of the vehicle operating constraints;
    transmit the vehicle policy to the smart vehicle;
    wherein the first set of the vehicle operating constraints comprises vehicle operating parameter limits that define a level of vehicle damage risk that is acceptable to an owner of the smart vehicle;
    wherein the second set of the vehicle operating constraints comprise vehicle operating parameter limits that define a level of vehicle wear and tear that is acceptable to the owner of the smart vehicle; and
    moderate the operation of the smart vehicle based at least in part on the vehicle policy, wherein moderating the operation of the smart vehicle based on the vehicle policy comprises providing the smart vehicle with instructions to perform an automatic action in response to a determination made by the smart vehicle that operation of the smart vehicle is predicted to violate a specified threshold for operation of the smart vehicle for a grace period of time, wherein the grace period of time is provided to an authorized user of the smart vehicle in a notification prior to automatically upgrading, wherein the automatic action comprises automatically upgrading the selected one of the plurality of sets of vehicle operation constraints, wherein moderating the operation of the smart vehicle comprises switching the smart vehicle from a driver-controlled mode to an autonomous driving mode in response to at least one of a command from policy management server or an occurrence of a detected violation of the operation of the smart vehicle;
    wherein the specified threshold comprises one of a maximum speed, a maximum acceleration, a maximum deceleration, a minimum distance to a neighboring object, a location that is out of a predefined boundary, and an environmental condition.

10. The system of claim 9, wherein the smart vehicle comprises an autonomous vehicle and moderating the operation of the smart vehicle based at least in part on the vehicle policy comprises providing the smart vehicle with instructions to operate within operational boundaries defined by the rules for operation of the smart vehicle.

11. The system of claim 9, wherein the vehicle operation constraints comprise limitations of the smart vehicle operation received from at least one of an owner of the smart vehicle and an insurer of the smart vehicle.

12. The system of claim 11, wherein the processor is further configured to generate an access agreement between the owner of the smart vehicle and an authorized user associated with the request to access the smart vehicle, wherein the access agreement memorializes terms of a rental of the smart vehicle by the authorized user.

13. The system of claim 12, wherein the access agreement is stored and executed as a smart contract in a decentralized distributed database.

14. A computer program product comprising a computer readable storage medium having program instructions embodied therewith the program instructions executable by a computer processor to cause the computer processor to perform a method comprising:
  receiving a request to access a smart vehicle;
  receiving vehicle operation constraints associated with the smart vehicle;
  generating, based at least in part on the request to access the smart vehicle and the vehicle operation constraints, a vehicle policy, the vehicle policy comprising rules for operation of the smart vehicle, wherein the vehicle policy is generated based at least in part on a first set of the vehicle operating constraints and a second set of the vehicle operating constraints;
  wherein the first set of the vehicle operating constraints comprises vehicle operating parameter limits that define a level of vehicle damage risk that is acceptable to an owner of the smart vehicle;
  wherein the second set of the vehicle operating constraints comprise vehicle operating parameter limits that define a level of vehicle wear and tear that is acceptable to the owner of the smart vehicle;
  transmitting the vehicle policy to the smart vehicle; and
  moderating the operation of the smart vehicle based at least in part on the vehicle policy, wherein moderating the operation of the smart vehicle based on the vehicle policy comprises providing the smart vehicle with instructions to perform an automatic action in response to a determination made by the smart vehicle that operation of the smart vehicle is predicted to violate a specified threshold for operation of the smart vehicle for a grace period of time, wherein the grace period of time is provided to an authorized user of the smart vehicle in a notification prior to automatically upgrading, wherein the automatic action comprises automatically upgrading the selected one of the plurality of sets of vehicle operation constraints, wherein moderating the operation of the smart vehicle comprises switching the smart vehicle from a driver-controlled mode to an autonomous driving mode in response to at least one of a command from policy management server or an occurrence of a detected violation of the operation of the smart vehicle;

wherein the specified threshold comprises one of a maximum speed, a maximum acceleration, a maximum deceleration, a minimum distance to a neighboring object, a location that is out of a predefined boundary, and an environmental condition.

15. The computer program product of claim 14, wherein the smart vehicle comprises a semi-autonomous vehicle and moderating the operation of the smart vehicle based on the vehicle policy comprises:

receiving sensor data from the smart vehicle;

determining, based on the sensor data, that an aspect of smart vehicle operation is approaching a boundary associated with a rule for operation of the smart vehicle; and causing the smart vehicle to perform an attenuation action.

* * * * *